(12) United States Patent
Li

(10) Patent No.: US 10,311,477 B2
(45) Date of Patent: Jun. 4, 2019

(54) METHOD FOR PROCESSING A MOBILE ADVERTISEMENT, PROXY SERVER, AND TERMINAL

(71) Applicant: Huawei Technologies Co., Ltd., Shenzhen (CN)

(72) Inventor: Guoyong Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1040 days.

(21) Appl. No.: 14/331,607

(22) Filed: Jul. 15, 2014

(65) Prior Publication Data
US 2014/0351047 A1 Nov. 27, 2014

Related U.S. Application Data

(63) Continuation of application No. PCT/CN2013/073115, filed on Mar. 25, 2013.

(30) Foreign Application Priority Data

Mar. 23, 2012 (CN) .......................... 2012 1 0080966

(51) Int. Cl.
*H04W 4/21* (2018.01)
*H04W 4/60* (2018.01)
(Continued)

(52) U.S. Cl.
CPC ..... *G06Q 30/0255* (2013.01); *G06Q 30/0267* (2013.01); *G06Q 30/0273* (2013.01);
(Continued)

(58) Field of Classification Search
CPC combination set(s) only.
See application file for complete search history.

(56) References Cited

U.S. PATENT DOCUMENTS 7,849,502 B1 * 12/2010 Bloch ............... H04L 29/12066
726/11
9,639,629 B1 * 5/2017 Venkat ................ H04L 67/2847
(Continued)

FOREIGN PATENT DOCUMENTS

CN 101019404 A 8/2007
CN 101582911 A 11/2009
(Continued)

OTHER PUBLICATIONS

Partial English Translation and Abstract of Chinese Patent Application No. CN101827017A, dated Aug. 26, 2014, 3 pages.
(Continued)

*Primary Examiner* — Marie P Brady
(74) *Attorney, Agent, or Firm* — Conley Rose, P.C.

(57) ABSTRACT

A method for processing a mobile advertisement, a proxy server, and a terminal are provided. The method includes: receiving, by a proxy server, an advertisement request sent by a proxy software development kit (SDK) embedded into an application, where the advertisement request information carries an identifier of the application; obtaining identifiers of corresponding advertisement networks and traffic allocation of the advertisement networks according to the identifier of the application; selecting an identifier of an advertisement network according to the traffic allocation, and sending an advertisement information request to the corresponding advertisement network according to the selected identifier of the advertisement network; and receiving advertisement information returned by the corresponding advertisement network according to the advertisement information request, and sending the advertisement information to the proxy SDK, so that the proxy SDK displays the advertisement information in an advertisement position of the application.

21 Claims, 16 Drawing Sheets

(51) Int. Cl.
*G06Q 30/02* (2012.01)
*H04L 29/08* (2006.01)
(52) U.S. Cl.
CPC ............... *H04L 67/28* (2013.01); *H04W 4/21* (2018.02); *H04W 4/60* (2018.02)

(56) References Cited

U.S. PATENT DOCUMENTS

| | | | |
|---|---|---|---|
| 2006/0058009 A1 | 3/2006 | Vogedes et al. | |
| 2008/0209451 A1* | 8/2008 | Michels | G06F 15/16 719/328 |
| 2010/0100615 A1* | 4/2010 | Lee | G06Q 30/02 709/223 |
| 2010/0131352 A1* | 5/2010 | Malhotra | G06Q 30/02 705/14.42 |
| 2011/0066488 A1* | 3/2011 | Ludewig | G06Q 30/00 705/14.43 |
| 2011/0238496 A1* | 9/2011 | Gurbuxani | G06Q 30/02 705/14.49 |
| 2011/0246307 A1* | 10/2011 | Zinkevich | G06Q 30/02 705/14.61 |
| 2012/0130801 A1* | 5/2012 | Baranov | G06Q 30/02 705/14.43 |
| 2012/0209717 A1* | 8/2012 | Henry | G06Q 30/02 705/14.64 |
| 2013/0203433 A1* | 8/2013 | Luna | H04W 28/06 455/452.1 |

FOREIGN PATENT DOCUMENTS

| | | |
|---|---|---|
| CN | 101827017 A | 9/2010 |
| CN | 102025845 A | 4/2011 |
| CN | 102647455 A | 8/2012 |
| EP | 2224685 A1 | 9/2010 |
| EP | 2323091 A1 | 5/2011 |
| EP | 2282272 A1 | 9/2011 |

OTHER PUBLICATIONS

Foreign Communication From a Counterpart Application, PCT Application No. PCT/CN2013/073115, English Translation of International Search Report dated Jul. 4, 2013, 3 pages.

Foreign Communication From a Counterpart Application, PCT Application No. PCT/CN2013/073115, English Translation of Written Opinion dated Jul. 4, 2013, 11 pages.

Foreign Communication From a Counterpart Application, European Application No. 13764159.3, Extended European Search Report dated Jan. 20, 2015, 7 pages.

* cited by examiner

Application setting-test006

| Advertisement network setting | Advertisement network name | ON/OFF | Weight% |
|---|---|---|---|
| | HiAD | ON | 90% |
| Application information setting | Madhouse | ON | 10% |
| | Wiyun | OFF | 0% |
| Advertisement position setting | AdMarket | OFF | 0% |
| | | | Total weight 100% |
| Application setting help | | Save | |

FIG. 3

| Advertisement network | | |
| --- | --- | --- |
| Add a network | | |
| Name | Website | Creation date |
| Madhouse | Http://www.madhouse.cn/ | 2011-10-13 |
| AdMarket | Http://www.admarkte.mobi/ | 2011-10-14 |
| Wiyun | Http://www.wiyun.com/ | 2011-10-14 |

FIG. 5

| User page access analysis | Selected application version | 1.1.1.500 | Output CSV file | | |
|---|---|---|---|---|---|
| Activity | Number of times of accessing a page | Average time on page | Percentage of time on page | Bounce rate | Jump |
| MainPage | 1277861 (45%) | 28.2 S | 61.3% | 32.7% | Unfold |
| BlogDetailPage | 901340 (32%) | 9.4 S | 14.4% | 3.6% | Unfold |
| UserPage | 175948 (6%) | 18.1 S | 5.4% | 4.4% | Unfold |
| OriginalPic | 120574 (4%) | 13.7 S | 2.8% | 3.5% | Unfold |
| ReplyPage | 97294 (3%) | 28.4 S | 4.7% | 2.3% | Unfold |
| CrTwitterPage | 84327 (3%) | 47.5 S | 6.8% | 29.0% | Unfold |
| ForwardPage | 38247 (1%) | 26.7 S | 1.7% | 1.8% | Unfold |
| TopicPage | 26227 (0%) | 25.2 S | 1.1% | 6.7% | Unfold |
| LoginAct | 18530 (0%) | 18.0 S | 0.6% | 15.8% | Unfold |
| ConfigPage | 17096 (0%) | 6.2 S | 0.2% | 12.2% | Unfold |
| MyProfilePage | 15500 (0%) | 9.7 S | 0.3% | 7.5% | Unfold |
| ThemeSelectPage | 11194 (0%) | 10.6 S | 0.2% | 9.5% | Unfold |
| SendMsgPage | 5221 (0%) | 40.8 S | 0.4% | 3.2% | Unfold |
| FileExplorerPage | 4358 (0%) | 25.4 S | 0.2% | 2.9% | Unfold |
| DirExplorerPage | 97 (0%) | 2.2 S | 0.0% | 3.1% | Unfold |
| BrowseExportPage | 7 (0%) | 7.9 S | 0.0% | 37.5% | Fold |

| Jump to | Proportion |
|---|---|
| MainPage | 57.1% |
| Leave the application | 42.9% |

FIG. 9

A terminal device of an application developer sends traffic allocation adjustment information to a proxy server, where the adjustment information carries an identifier of an application, an identifier of an advertisement network to be adjusted, and an adjusted traffic allocation proportion of the advertisement network, so that the proxy server obtains identifiers of advertisement networks corresponding to the application according to the identifier of the application, determines, in the obtained identifiers of the advertisement networks, the identifier of the advertisement network to be adjusted, and adjusts, according to the adjusted traffic allocation proportion, a traffic proportion corresponding to the identifier of the advertisement network to be adjusted ⟶ 131

FIG. 11

METHOD FOR PROCESSING A MOBILE ADVERTISEMENT, PROXY SERVER, AND TERMINAL

CROSS-REFERENCE TO RELATED APPLICATIONS

This application is a continuation of International Application No. PCT/CN2013/073115, filed on Mar. 25, 2013, which claims priority to Chinese Patent Application No. 201210080966.1, filed on Mar. 23, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communications technologies, and in particular, to a method for processing a mobile advertisement, a proxy server, and a terminal.

BACKGROUND

Mobile applications emerge as the mobile Internet is flourishing. Numerous mobile application developers generally earn money for development and maintenance of the applications by means of mobile advertisements while providing services of downloading the applications freely. Accordingly, advertisement networks for providing the mobile advertisements are also developed flourishingly. The advertisement network for providing the mobile advertisement may provide network registration, software development kit (SDK) embedding, and the like. After registering with the advertisement network, an application developer may embed an SDK of the advertisement network into an application of the application developer. In this case, the application becomes a medium of the advertisement network and places an advertisement for the advertisement network. The revenue of the advertisement is allocated between the advertisement network and the application developer.

If an advertisement network cannot satisfy a placement capability of an application, an application developer needs to register with a plurality of advertisement networks, obtain SDKs of the plurality of advertisement networks, and embed the SDKs into the application of the application developer. In this way, the following problems occur: the volume of the application is larger and larger, thereby wasting the bandwidth and storage space of a final user; when an advertisement network is added, an SDK of the advertisement network needs to be embedded into the application, and the final user needs to upgrade the application; and when a certain advertisement network needs to upgrade an SDK, the application needs to be upgraded accordingly.

SUMMARY

In order to effectively reduce the volume of an application that is continuously increased because SDKs of a plurality of advertisement networks are embedded into the application and reduce the upgrading frequency of the application, an embodiment of the present invention provides a method for processing a mobile advertisement, where the method includes: receiving, by a proxy server, advertisement request information sent by a proxy SDK embedded into an application, where the advertisement request information carries an identifier of the application; obtaining identifiers of corresponding advertisement networks and traffic allocation of the advertisement networks according to the identifier of the application; selecting an identifier of an advertisement network according to the traffic allocation, and sending an advertisement request to the corresponding advertisement network according to the selected identifier of the advertisement network; and receiving advertisement information returned by the corresponding advertisement network, and sending the advertisement information to the proxy SDK, so that the proxy SDK displays the advertisement information in an advertisement position of the application.

An embodiment of the present invention also provides a method for processing a mobile advertisement, where the method includes: sending traffic allocation adjustment information to a proxy server, where the adjustment information carries an identifier of an application, an identifier of an advertisement network to be adjusted, and an adjusted traffic allocation proportion of the advertisement network, so that the proxy server obtains identifiers of advertisement networks according to the identifier of the application, determines, in the obtained identifiers of the advertisement networks, the identifier of the advertisement network to be adjusted, and adjusts, according to the adjusted traffic allocation proportion, traffic allocation corresponding to the identifier of the advertisement network to be adjusted.

An embodiment of the present invention also provides a proxy server, where the proxy server includes: a receiving module configured to receive an advertisement request sent by a proxy SDK embedded into an application, where the advertisement request carries an identifier of the application; an obtaining module configured to obtain identifiers of corresponding advertisement networks and traffic allocation of the advertisement networks according to the identifier of the application; a requesting module configured to select an identifier of an advertisement network according to the traffic allocation, and send an advertisement information request to the corresponding advertisement network according to the selected identifier of the advertisement network; and a forwarding module configured to receive advertisement information returned by the corresponding advertisement network according to the advertisement information request, and send the advertisement information to the proxy SDK, so that the proxy SDK displays the advertisement information in an advertisement position of the application.

An embodiment of the present invention also provides a terminal, where the terminal includes: a sending module configured to send traffic allocation adjustment information to a proxy server, where the adjustment information carries an identifier of an application, an identifier of an advertisement network to be adjusted, and an adjusted traffic allocation proportion of the advertisement network, so that the proxy server obtains identifiers of advertisement networks according to the identifier of the application, determines, in the obtained identifiers of the advertisement networks, the identifier of the advertisement network to be adjusted, and adjusts, according to the adjusted traffic allocation proportion, traffic allocation corresponding to the identifier of the advertisement network to be adjusted.

In the technical solutions provided by the embodiments of the present invention, a proxy SDK embedded into an application sends an advertisement request to a proxy server, the proxy server obtains identifiers of advertisement networks corresponding to the application and traffic allocation of the advertisement networks according to an identifier of the application carried in the advertisement request, and selects an advertisement network according to the traffic allocation, and the proxy server sends an advertisement request to the selected advertisement network and sends received advertisement information to the proxy SDK to display the advertisement information. Through this method, the trouble that a plurality of advertisement network SDKs is included in an application is effectively avoided, the volume of an application is directly reduced, and the problem of frequent upgrading of an application is solved; an application developer only needs to perform information interaction with the proxy server, thereby avoiding information interaction with a plurality of advertisement networks, and effectively protecting safety information of the application developer.

BRIEF DESCRIPTION OF THE DRAWINGS

FIG. 3 is a schematic diagram of a setting interface of a proxy server according to Embodiment 1 of the present invention;

FIG. 5 is a schematic diagram of an adjustment interface of a proxy server according to Embodiment 2 of the present invention;

FIG. 9 is a schematic diagram of a statistic result display interface of a proxy server according to Embodiment 5 of the present invention;

FIG. 11 is a flow chart of a method for processing a mobile advertisement according to Embodiment 6 of the present invention;

DETAILED DESCRIPTION

Figure 1:
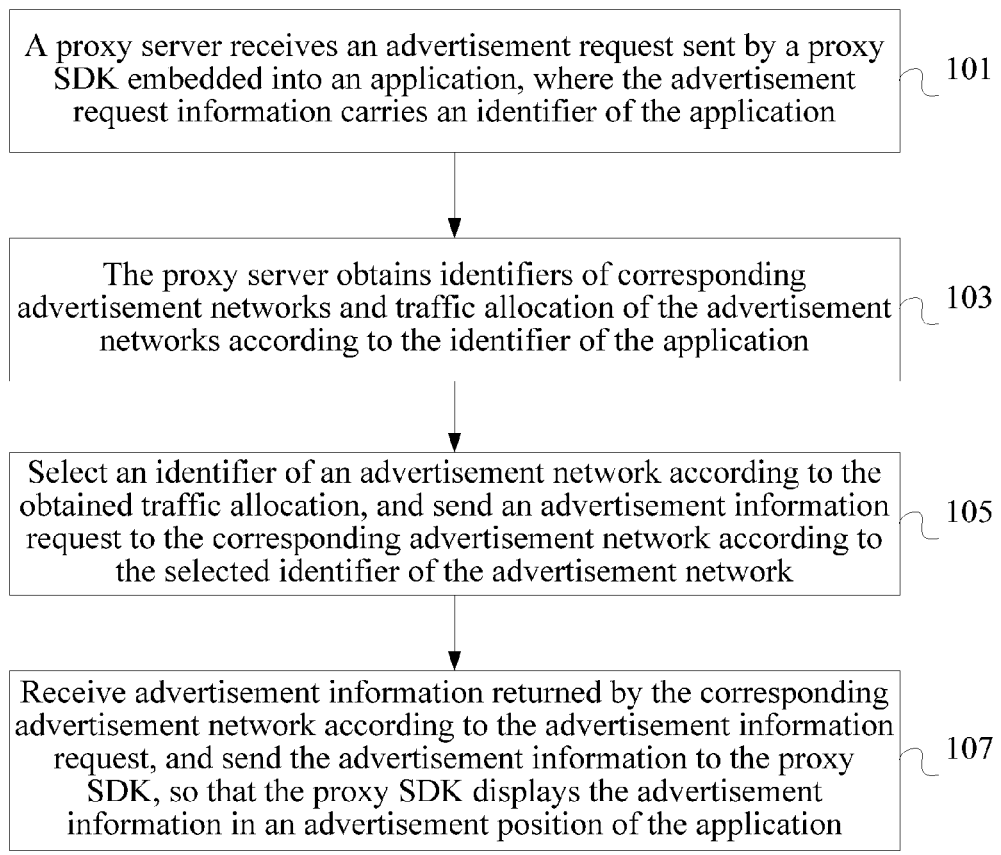
FIG. 1 is a flow chart of a method for processing a mobile advertisement according to Embodiment 1 of the present invention.
Figure 2:
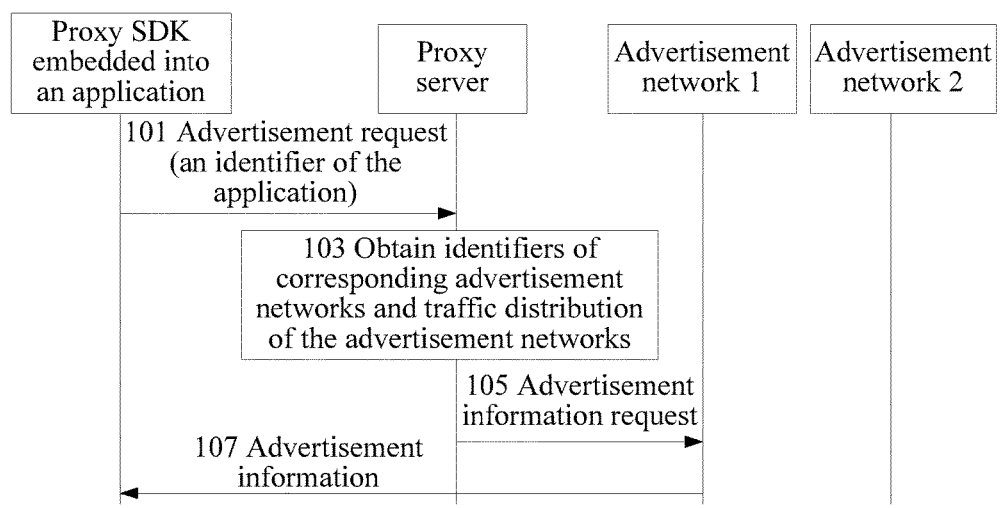
FIG. 2 is an interaction diagram of the method for processing the mobile advertisement according to Embodiment 1 of the present invention.

FIG. 1 is a flow chart of a method for processing a mobile advertisement according to Embodiment 1 of the present invention. FIG. 2 is an interaction diagram of the method for processing the mobile advertisement provided by Embodiment 1 of the present invention. According to the content shown in FIG. 1 and FIG. 2, the processing method may include the following steps:

Step 101: A proxy server receives an advertisement request sent by a proxy SDK embedded into an application, where the advertisement request information carries an identifier of the application.

It should be noted that, the proxy SDK may be embedded into the application in the following manners, including, but not limited to: registering, by an application developer, with the proxy server, and embedding, by using methods such as software programming, the proxy SDK obtained after registration into the application developed by the application developer. Generally, the size of the proxy SDK is about 100 kilobytes (kB). Compared with SDKs of a plurality of advertisement networks in the prior art, the proxy SDK reduces the volume of the application well.

The advertisement request is generally sent to the proxy server proactively when the application begins to run, and the advertisement request may also be sent to the proxy server when a trigger condition is satisfied, which are not limited specifically herein.

Step 103: The proxy server obtains identifiers of corresponding advertisement networks and traffic allocation of the advertisement networks according to the identifier of the application.

It should be noted that, different applications may correspond to the same advertisement network or different advertisement networks. Here, identifiers of applications identify different applications, and identifiers of advertisement networks identify different advertisement networks. An identifier may be symbols having a specific meaning, and may also be any combination of a numeral, a string, and a symbol as long as the identifier can uniquely identify an application/advertisement network.

Generally, the proxy server may allocate different advertisement networks to different applications, which generally relates to a protocol agreed between the application developer and the proxy server when the application developer performs registration. For example, for the proxy server, different applications may have different levels at the proxy server due to different standards of proxy fee calculation. An advertisement network allocated to an application with a higher grade may be better than an advertisement network allocated to an application with a lower grade. Once an identifier of an application is obtained, advertisement networks that the application can obtain are determined. Obtainable advertisement networks may have different traffic allocation. The application developer may set traffic allocation, as shown in FIG. 3. FIG. 3 is a schematic diagram of a setting interface of a proxy server according to Embodiment 1 of the present invention. Definitely, the set traffic allocation may also be updated at any time. The updating the set traffic allocation is described in more detail subsequently.

Step 105: Select an identifier of an advertisement network according to the obtained traffic allocation, and send an advertisement information request to the corresponding advertisement network according to the selected identifier of the advertisement network.

Specifically, the selecting the identifier of the advertisement network according to the obtained traffic allocation may include, but is not limited to, generating, by the proxy server, a random number in a preset numerical range, and selecting the identifier of the advertisement network according to a correspondence between a proportion of the random number in the preset numerical range and traffic allocation. For example, the proxy server supports three advertisement networks A, B, and C, where the advertisement networks may have different conditions. The application developer selects two advertisement networks A and B, where 70% of traffic is allocated to A, and 30% of traffic is allocated to B. The proxy server generates a random number in a certain range. Assume that the range is 0 to 1, if the random number is between 0 and 0.7, A is selected, and if the random number is between 0.7 and 1, B is selected. Definitely, this is only one of the simplest forms, and many different variations may exist and are not described here.

Step 107: Receive advertisement information returned by the corresponding advertisement network according to the advertisement information request, and send the advertisement information to the proxy SDK, so that the proxy SDK displays the advertisement information in an advertisement position of the application.

Figure 4:
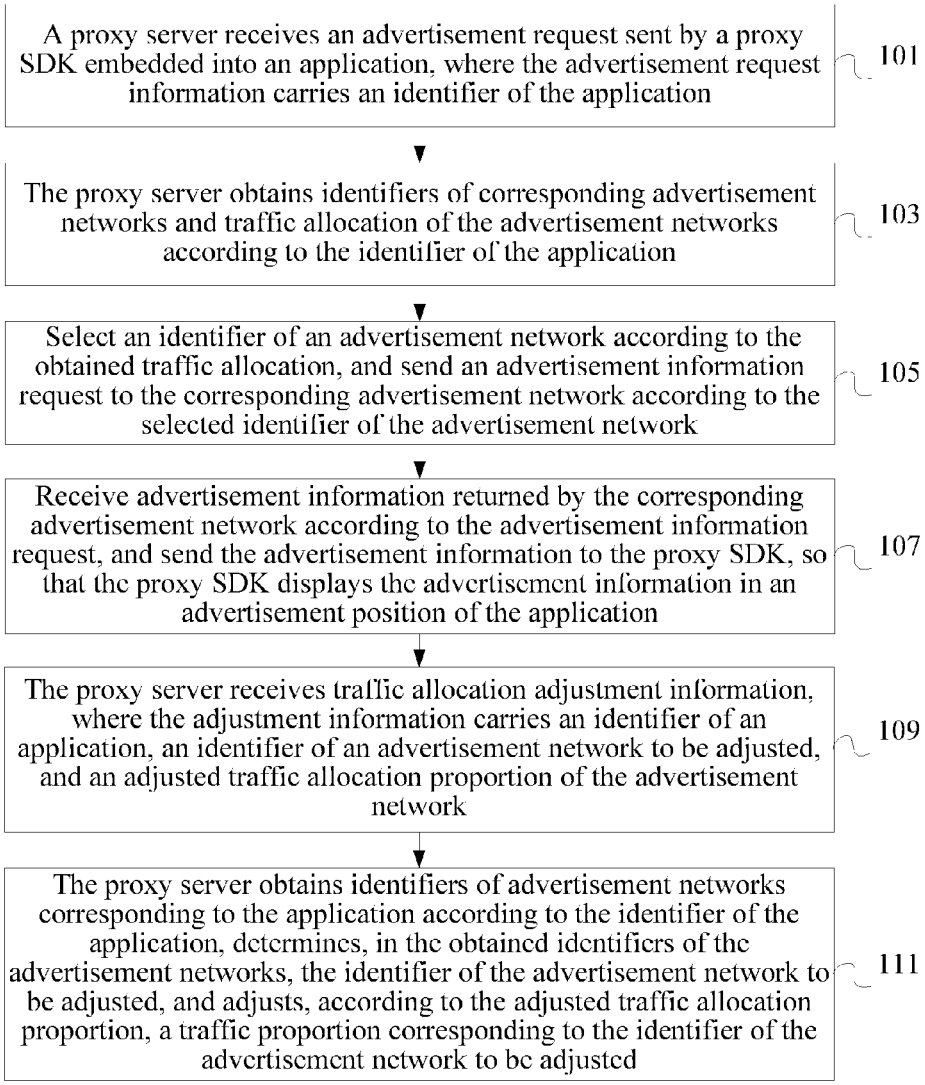
FIG. 4 is a flow chart of a method for processing a mobile advertisement according to Embodiment 2 of the present invention.

FIG. 4 is a flow chart of a method for processing a mobile advertisement according to Embodiment 2 of the present invention. As shown in FIG. 4, the processing method may further include the following steps on the basis of the foregoing embodiment:

Step 109: The proxy server receives traffic allocation adjustment information, where the adjustment information carries an identifier of an application, an identifier of an advertisement network to be adjusted, and an adjusted traffic allocation proportion of the advertisement network.

The traffic allocation adjustment information may be set on a network interface of the proxy server through a network by using, by the application developer, a terminal device. A setting interface may still be shown in FIG. 3.

Step 111: The proxy server obtains identifiers of advertisement networks corresponding to the application according to the identifier of the application, determines, in the obtained identifiers of the advertisement networks, the identifier of the advertisement network to be adjusted, and adjusts, according to the adjusted traffic allocation proportion, a traffic proportion corresponding to the identifier of the advertisement network to be adjusted.

As a special case of adjustment, according to a schematic diagram of an adjustment interface shown in FIG. 5, deleting and adding an identifier of an advertisement network may also be covered in the protection scope claimed by Embodiment 2 of the present invention.

Figure 6:
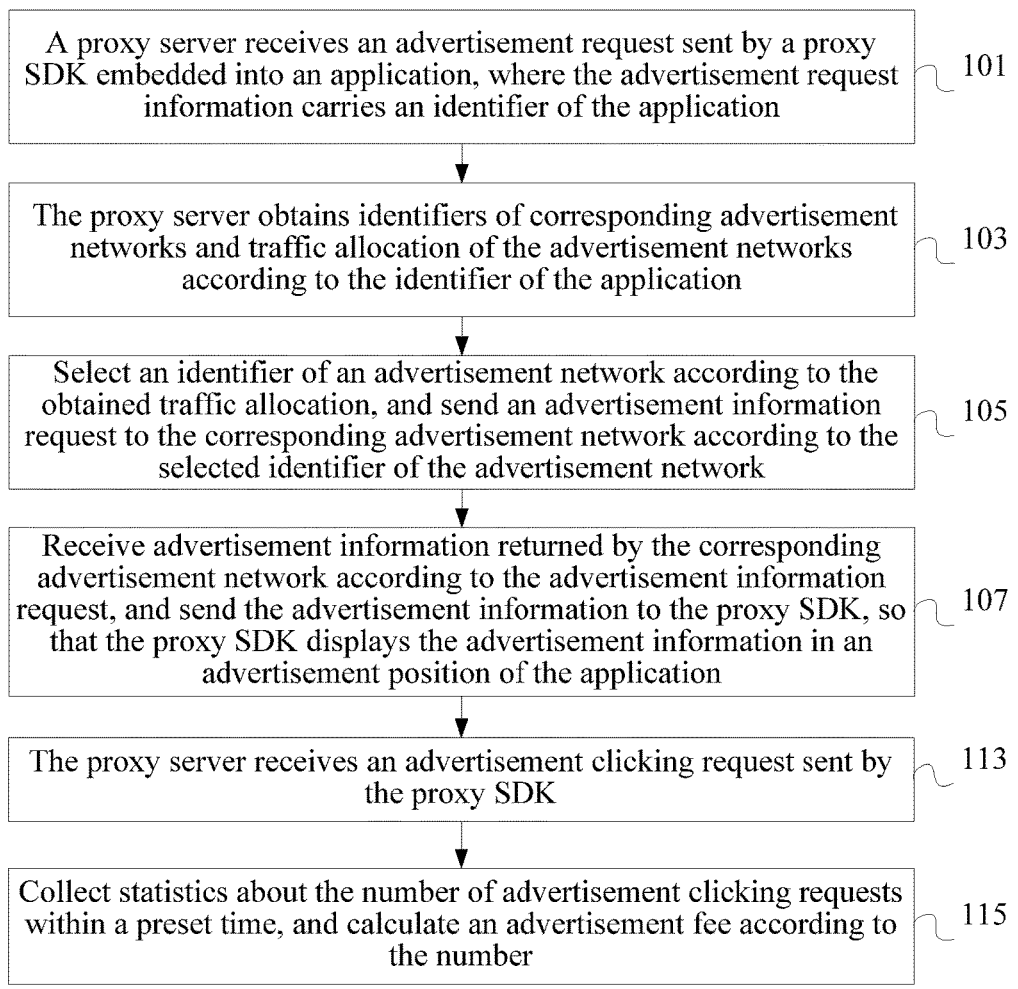
FIG. 6 is a flow chart of a method for processing a mobile advertisement according to Embodiment 3 of the present invention.

FIG. 6 is a flow chart of a method for processing a mobile advertisement according to Embodiment 3 of the present invention. As shown in FIG. 6, the processing method may further include the following steps on the basis of the foregoing embodiment:

Step 113: The proxy server receives an advertisement clicking request sent by the proxy SDK.

Step 115: Count the number of advertisement clicking requests within a preset time, and calculate an advertisement fee according to the number.

Figure 7:
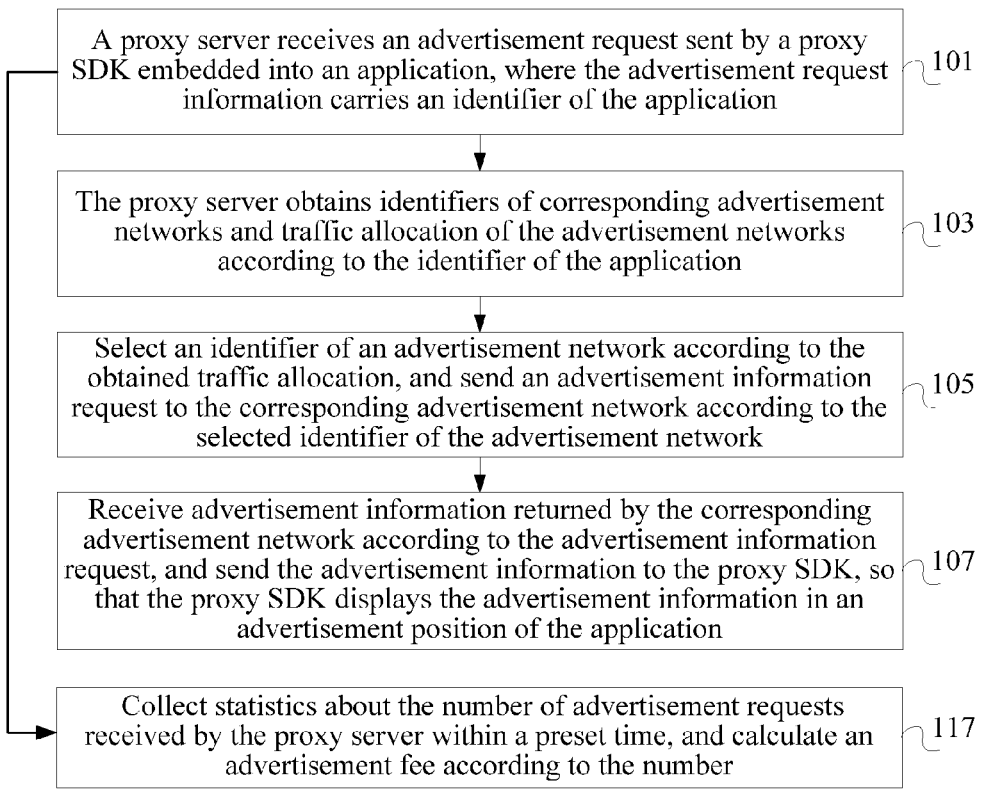
FIG. 7 is a flow chart of a method for processing a mobile advertisement according to Embodiment 4 of the present invention.

Alternatively, as shown in FIG. 7, which is a flow chart of a method for processing a mobile advertisement according to Embodiment 4 of the present invention, after step 101, the method may further include the following step:

Step 117: Collect statistics about the number of advertisement requests received by the proxy server between preset time, and calculate an advertisement fee according to the number.

By adding steps 113 to 115 or step 117, the proxy server can collect statistics about the advertisement fee.

Figure 8:
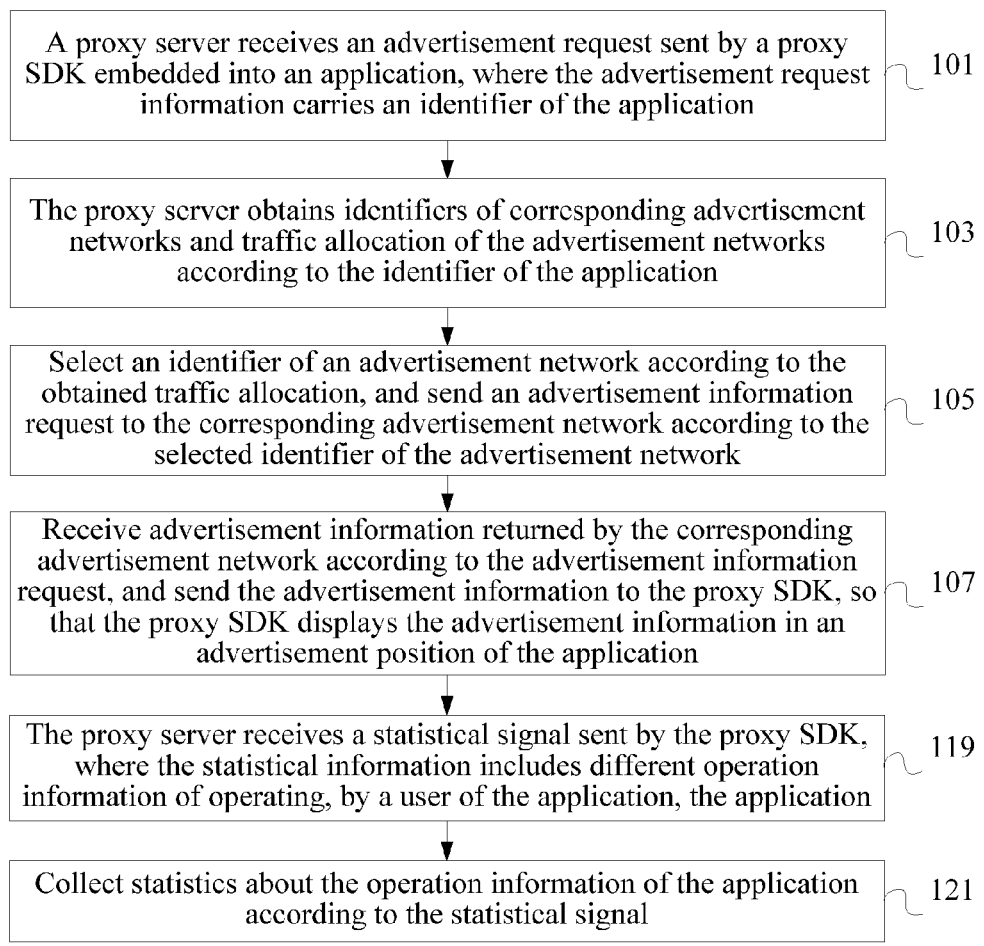
FIG. 8 is a flow chart of a method for processing a mobile advertisement according to Embodiment 5 of the present invention.

Further, FIG. 8 is a flow chart of a method for processing a mobile advertisement according to Embodiment 5 of the present invention. As shown in FIG. 8, the method may further include the following steps on the basis of the foregoing embodiment:

Step 119: The proxy server receives a statistical signal sent by the proxy SDK, where the statistical information includes different operation information of operating, by a user of the application, the application.

The operation information may be, but is not limited to, operation information of entering a main interface, operation information of entering a certain sub-interface, operation information of sending information, operation information of entering a game interface, or the like.

Step 121: Collect statistics about the operation information of the application according to the statistical signal.

For example, the statistics include the number of times of accessing a certain interface, an average time on interface, an interface bounce rate, and the like. FIG. 9 is a schematic diagram of a statistic result display interface of a proxy server provided by Embodiment 5 of the present invention.

Figure 10:
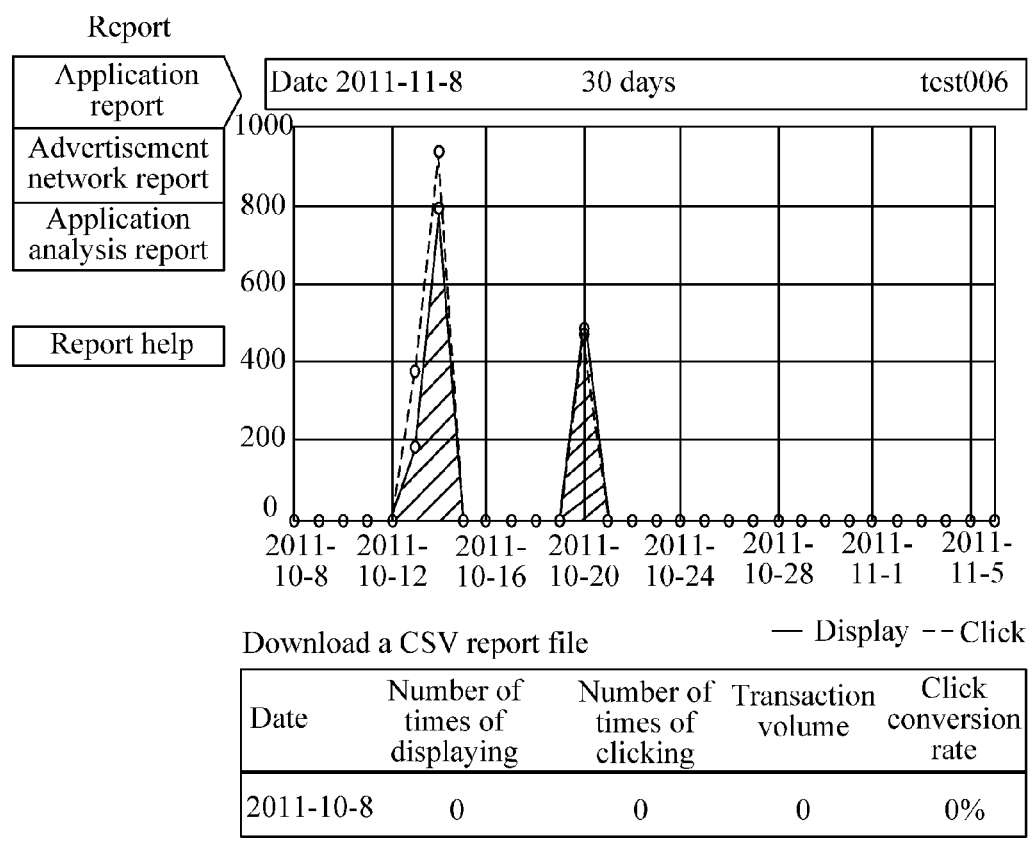
FIG. 10 is a schematic diagram of a statistic analysis interface of the proxy server according to Embodiment 5 of the present invention.

Specifically, for example, assume that the application is a common game: Plants vs Zombies, the statistical signal may be operation information of accessing a main interface by an operator, operation information of entering each level, operation information of entering a small game interface, or the like. According to received statistical signals, statistics of operations of using the application of the game may be collected, and the statistics are provided for the application developer as a value-added service. For example, a long time spent in accessing the main interface is too long indicates that the application developer may devote himself or herself to further simplifying the main interface or shortening the time of loading the game. The application developer can clearly know the number of times the user of the application opens each interface, a stay duration on interface, and the like according to the statistics, and by analyzing the statistics, know which functions more concern the user of the application and which interfaces are not easy to operate, so as to optimize the application. FIG. 10 is a schematic diagram of a statistic analysis interface of a proxy server provided by Embodiment 5 of the present invention.

Persons of ordinary skill in the art can understand that, all or a part of the steps of the method according to the embodiments may be implemented by a program instructing relevant hardware. The program may be stored in a computer readable storage medium. When the program is run, the steps of the method according to the embodiments are performed. The storage medium may be any medium capable of storing program codes, such as a read-only memory (ROM), a random-access memory (RAM), a magnetic disk, or an optical disk.

In the solutions provided by the embodiments of the present invention, a proxy SDK embedded into an application sends an advertisement request to a proxy server, the proxy server obtains identifiers of advertisement networks corresponding to the application and traffic allocation of the advertisement networks according to an identifier of the application carried in the advertisement request, and selects an advertisement network according to the traffic allocation, and the proxy server sends an advertisement request to the selected advertisement network and sends received advertisement information to the proxy SDK to display the advertisement information. Through this method, the trouble that a plurality of advertisement network SDKs is included in an application is effectively avoided, the volume of an application is directly reduced, and the problem of frequent upgrading of an application is solved; an application developer only needs to perform information interaction with the proxy server, thereby avoiding information interaction with a plurality of advertisement networks, and effectively protecting safety information of the application developer.

FIG. 11 is a flow chart of a method for processing a mobile advertisement according to Embodiment 6 of the present invention. As shown in FIG. 11, an execution subject of this embodiment is a terminal device of an application developer and is different from an execution subject of the method shown in FIG. 4. Therefore, the procedure in FIG. 11 and the procedure of the method shown in FIG. 4 correspond to each other. As shown in FIG. 11, the method includes the following step:

Step 131: A terminal device of an application developer sends traffic allocation adjustment information to a proxy server, where the adjustment information carries an identifier of an application, an identifier of an advertisement network to be adjusted, and an adjusted traffic allocation proportion of the advertisement network, so that the proxy server obtains identifiers of advertisement networks corresponding to the application according to the identifier of the application, determines, in the obtained identifiers of the advertisement networks, the identifier of the advertisement network to be adjusted, and adjusts, according to the adjusted traffic allocation proportion, a traffic proportion corresponding to the identifier of the advertisement network to be adjusted.

It should be further noted that, the mobile terminal of the application developer may also send traffic allocation information to the proxy server in an initialization stage, where the traffic allocation information may also carry an identifier of an application, an identifier of an advertisement network, and an initial traffic allocation proportion corresponding to the advertisement network, so that the proxy server establishes an association relationship between the application represented by the identifier of the application and the advertisement network represented by the identifier of the advertisement network and saves the initial traffic allocation proportion as initial data. The initial traffic allocation is used as a known traffic allocation proportion. Only after step 131 is executed, the adjusted traffic allocation proportion replaces the initial traffic allocation proportion and is used as a traffic allocation proportion known in the subsequent execution steps.

Figure 12:
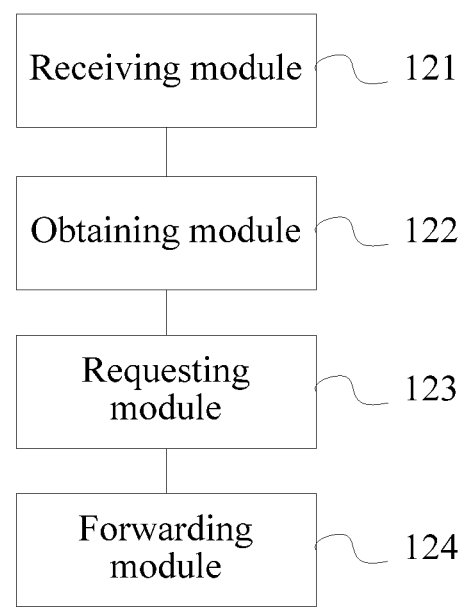
FIG. 12 is a schematic structural diagram of a proxy server according to Embodiment 7 of the present invention.

FIG. 12 is a schematic diagram of a proxy server according to Embodiment 7 of the present invention. As shown in FIG. 12, the proxy server is a specific execution subject of the method provided by the foregoing method embodiments. For the procedure of the method, reference may be made to the foregoing method embodiments, and the details are not described here again. The proxy server includes a receiving module 121, an obtaining module 122, a requesting module 123, and a forwarding module 124. The receiving module 121 is configured to receive an advertisement request sent by a proxy SDK embedded into an application, where the advertisement request carries an identifier of the application. The obtaining module 122 is configured to obtain identifiers of corresponding advertisement networks and traffic allocation of the advertisement networks according to the identifier of the application. The requesting module 123 is configured to select an identifier of an advertisement network according to the traffic allocation, and send an advertisement information request to the corresponding advertisement network according to the selected identifier of the advertisement network. The forwarding module 124 is configured to receive advertisement information returned by the corresponding advertisement network according to the advertisement information request, and send the advertisement information to the proxy SDK, so that the proxy SDK displays the advertisement information in an advertisement position of the application.

On the basis of the foregoing implementation manner, the requesting module 123 may include a selection unit configured to select the identifier of the advertisement network according to the traffic allocation, and a requesting unit configured to send the advertisement information request to the corresponding advertisement network according to the selected identifier of the advertisement network. The selection unit may include a random number generating sub-unit and a selection sub-unit. The random number generating sub-unit is configured to generate a random number in a preset numerical range. The selection sub-unit is configured to select the identifier of the advertisement network according to a correspondence between a proportion of the random number in the preset numerical range and the traffic allocation.

Figure 13:
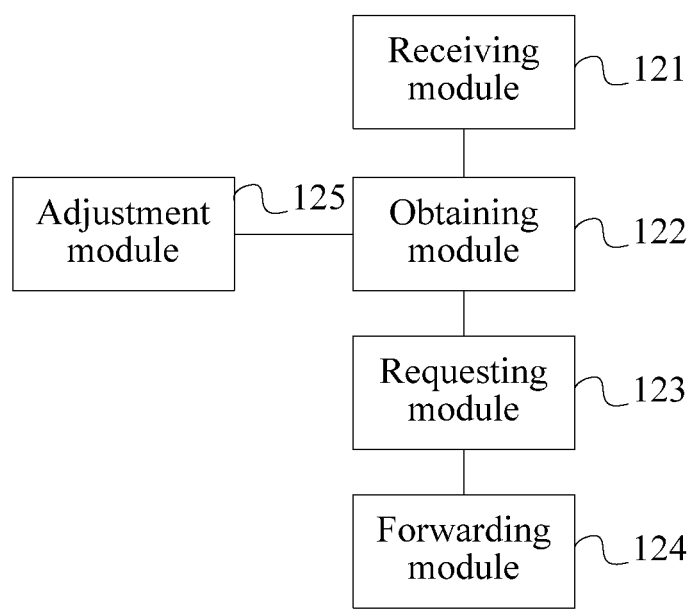
FIG. 13 is a schematic structural diagram of a proxy server according to Embodiment 8 of the present invention.

Further, FIG. 13 is a schematic structural diagram of a proxy server according to Embodiment 8 of the present invention. On the basis of the foregoing embodiment, the proxy server shown in FIG. 13 may further include an adjustment module 125. The adjustment module 125 may specifically include: a receiving unit, an obtaining unit, a determination unit, and an adjustment unit. The receiving unit is configured to receive traffic allocation adjustment information, where the adjustment information carries an identifier of an application, an identifier of an advertisement network to be adjusted, and an adjusted traffic allocation proportion of the advertisement network. The obtaining unit is configured to obtain identifiers of advertisement networks according to the identifier of the application. The determination unit is configured to determine, in the obtained identifiers of the advertisement networks, the identifier of the advertisement network to be adjusted. The adjustment unit is configured to adjust, according to the adjusted traffic allocation proportion, traffic allocation of the advertisement network to be adjusted.

Figure 14:
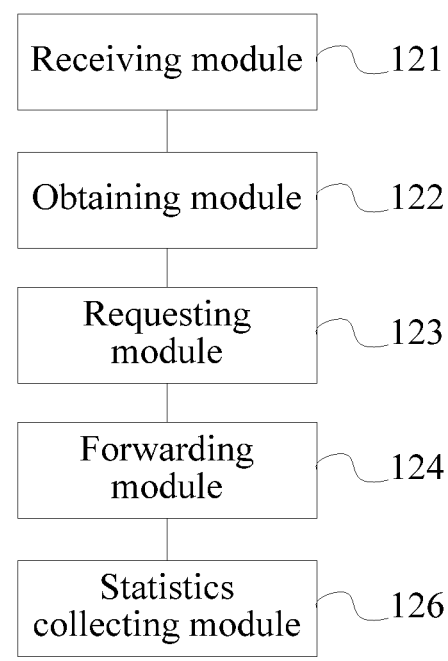
FIG. 14 is a schematic structural diagram of a proxy server according to Embodiment 9 of the present invention.

Further, FIG. 14 is a schematic structural diagram of a proxy server according to Embodiment 9 of the present invention. On the basis of the foregoing embodiment, the proxy server shown in FIG. 14 may further include a statistics collecting module 126. The statistics collecting module 126 may specifically include a receiving unit and a statistics collecting unit. The receiving unit is configured to receive a statistical signal sent by the proxy SDK, where the statistical information includes operation information of operating, by a user of the application, the application. The statistics collecting unit is configured to collect statistics about the operation information of the application according to the statistical signal.

Figure 15:
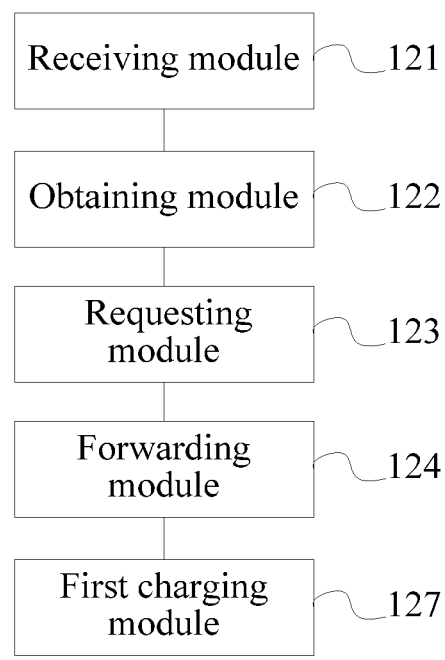
FIG. 15 is a schematic structural diagram of a proxy server according to Embodiment 10 of the present invention.

Further, FIG. 15 is a schematic structural diagram of a proxy server according to Embodiment 10 of the present invention. On the basis of the foregoing embodiment, the proxy server shown in FIG. 15 may further include a first charging module 127. The first charging module 127 may specifically include a receiving unit, a statistics collecting unit, and a charging unit. The receiving unit is configured to receive an advertisement clicking request sent by the proxy SDK. The statistics collecting unit is configured to count the number of advertisement clicking requests within a preset time. The charging unit is configured to calculate an advertisement fee according to the number of the advertisement clicking requests.

Figure 16:
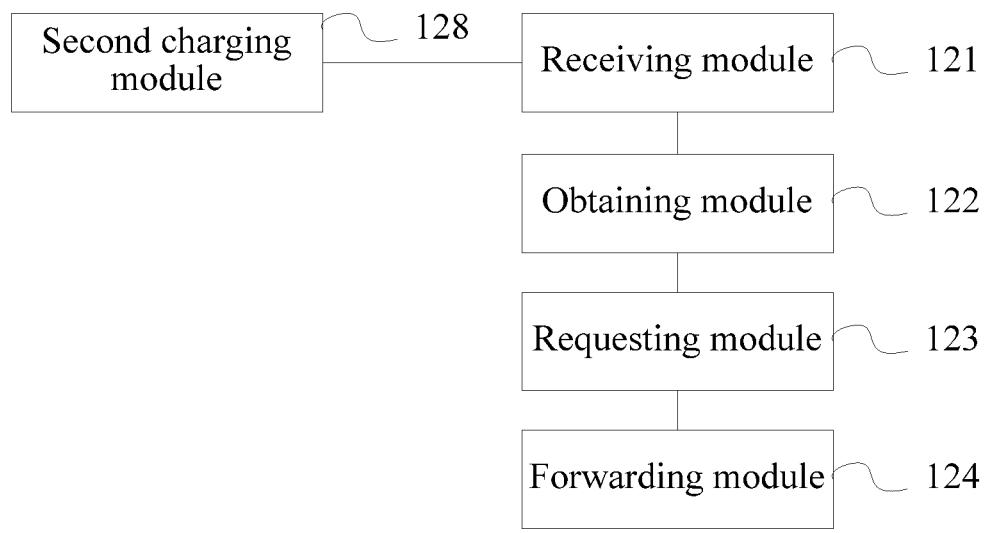
FIG. 16 is a schematic structural diagram of a proxy server according to Embodiment 11 of the present invention.

Further, FIG. 16 is a schematic structural diagram of a proxy server according to Embodiment 11 of the present invention. On the basis of the foregoing embodiment, the proxy server shown in FIG. 16 may further include a second charging module 128. The second charging module 128 may specifically include a statistics collecting unit and a charging unit. The statistics collecting unit is configured to collect statistics about the number of advertisement requests received within a preset time. The charging unit is configured to calculate an advertisement fee according to the number of the advertisement requests.

Figure 17:
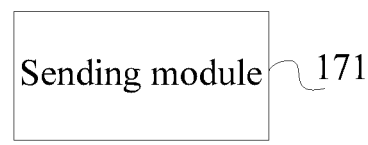
FIG. 17 is a schematic structural diagram of a terminal according to Embodiment 12 of the present invention.

FIG. 17 is a schematic structural diagram of a terminal according to Embodiment 12 of the present invention. As shown in FIG. 17, the terminal may be understood as a terminal of an application developer and is an execution subject of the method procedure shown in FIG. 11. The specific procedure may be shown in FIG. 11 or FIG. 4 and is not described here again. As shown in FIG. 17, the terminal includes a sending module 171 configured to send traffic allocation adjustment information to a proxy server, where the adjustment information carries an identifier of an application, an identifier of an advertisement network to be adjusted, and an adjusted traffic allocation proportion of the advertisement network, so that the proxy server obtains identifiers of advertisement networks corresponding to the application according to the identifier of the application, determines, in the obtained identifiers of the advertisement networks, the identifier of the advertisement network to be adjusted, and adjusts, according to the adjusted traffic allocation proportion, a traffic proportion corresponding to the identifier of the advertisement network to be adjusted.

Further, the sending module 171 may also send traffic allocation information to the proxy server in an initialization stage, where the traffic allocation information may also carry an identifier of an application, an identifier of an advertisement network, and an initial traffic allocation proportion corresponding to the advertisement network, so that the proxy server establishes an association relationship between the application represented by the identifier of the application and the advertisement network represented by the identifier of the advertisement network and saves the initial traffic allocation proportion as initial data. The initial traffic allocation is used as a known traffic allocation proportion. Only after step 131 is executed, the adjusted traffic allocation proportion replaces the initial traffic allocation proportion and is used as a traffic allocation proportion known in the subsequent execution steps.

According to the description of the foregoing implementation manners, persons skilled in the art can clearly understand that, the present invention can be implemented through hardware, firmware, or a combination thereof. When implemented in software, the functions may be stored on or transmitted over as one or more instructions or code on a computer-readable medium. The computer-readable medium includes both a computer storage medium and a communication medium. The communication medium includes any medium that facilitates transfer of a computer program from one place to another. A storage medium may be any available medium that can be accessed by a computer. By way of example, and not limitation, such computer-readable medium may include a RAM, a ROM, an electrically erasable programmable read-only memory (EEPROM), a compact disc read-only memory (CD-ROM) or other optical disk storage or magnetic disk storage media, or other magnetic storage devices, or any other medium that can be used to carry or store desired program codes in the form of instructions or data structures and that can be accessed by a computer. Moreover, any connection is properly termed a computer-readable medium. For example, if the software is transmitted from a website, server, or other remote sources using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of the medium. Disk and disc, as used in the present invention, includes a compact disc (CD), laser disc, optical disc, digital versatile disc (DVD), floppy disk and blu-ray disc, where disks usually reproduce data magnetically, while discs reproduce data optically with lasers. Combinations of the foregoing should also be included within the protection scope of the computer-readable medium.

Finally, it should be noted that, the foregoing embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to a part or all of technical features in the technical solutions, as long as such modifications or replacements do not cause the essence of corresponding technical solutions to depart from the scope of the technical solutions of the embodiments of the present invention.

What is claimed is:

1. A method for processing a mobile advertisement, comprising:
   receiving, by a proxy server, an advertisement request from a proxy software development kit (SDK) embedded into an application running on a mobile device, wherein the advertisement request comprises an application identifier of the application, and wherein the proxy server supports a plurality of advertising networks;
   obtaining, by the proxy server, a plurality of identifiers corresponding to a subset of the plurality of advertisement networks based, at least in part, on the application identifier;
   obtaining, by the proxy server, a plurality of traffic allocations corresponding to the subset of the plurality of advertisement networks based, at least in part, on the application identifier;
   selecting, by the proxy server, a network identifier of one of the subset of the plurality of advertisement networks based, at least in part, on the plurality of traffic allocations;
   sending, by the proxy server, an advertisement information request to an advertisement network corresponding to the network identifier;
   receiving, by the proxy server, advertisement information returned by the advertisement network responsive to the advertisement information request; and
   sending, by the proxy server, the advertisement information to the proxy SDK.

2. The method of claim 1, wherein selecting the network identifier comprises:
generating, by the proxy server, a random number in a preset numerical range; and
selecting the network identifier based on a correspondence between the random number and a numerical value of a portion of traffic allocated to the advertisement network corresponding to the network identifier.

3. The method of claim 1, further comprising:
receiving traffic allocation adjustment information comprising an identifier of a to-be-adjusted application, an identifier of a to-be-adjusted advertisement network, and an adjusted traffic allocation proportion of the to-be-adjusted advertisement network; and
adjusting a traffic allocation corresponding to the identifier of the to-be-adjusted advertisement network to the adjusted traffic allocation proportion.

4. The method of claim 1, further comprising:
receiving, by the proxy server, statistical information from the proxy SDK, wherein the statistical information comprises operation information of operating of the application.

5. The method of claim 3, further comprising:
receiving, by the proxy server, statistical information from the proxy SDK, wherein the statistical information comprises operation information of the to-be-adjusted application; and
collecting statistics about the operation information based, at least in part, on the statistical information.

6. The method of claim 1, further comprising:
receiving, by the proxy server, an advertisement clicking request from the proxy SDK;
counting a number of advertisement clicking requests within a preset time; and
calculating an advertisement fee based, at least in part, on the number of the advertisement clicking requests.

7. The method of claim 5, further comprising:
receiving, by the proxy server, an advertisement clicking request from the proxy SDK;
counting a number of advertisement clicking requests within a preset time; and
calculating an advertisement fee based, at least in part, on the number of the advertisement clicking requests.

8. The method of claim 1, further comprising:
collecting, by the proxy server, a number of advertisement requests received within a preset time; and
calculating an advertisement fee based, at least in part, on the number of the advertisement requests.

9. A method for processing a mobile advertisement, comprising:
sending initial traffic allocation information to a proxy server during initialization of the proxy server, wherein the initial traffic allocation information comprises an identifier of an application, an identifier of an advertisement network, and an initial traffic allocation proportion of the advertisement network; and
sending traffic allocation adjustment information to the proxy server, wherein the traffic allocation adjustment information comprises the identifier of the application, the identifier of the advertisement network, and an adjusted traffic allocation proportion of the advertisement network.

10. A proxy server, comprising:
a memory; and
a processor coupled to the memory, wherein the processor is configured to:
receive an advertisement request from a proxy software development kit (SDK) embedded into an application running on a mobile device, wherein the advertisement request comprises an application identifier of the application, and wherein the proxy server supports a plurality of advertising networks;
obtain a plurality of identifiers corresponding to a subset of the plurality of advertisement networks based, at least in part, on the application identifier;
obtain a plurality of traffic allocations corresponding to the plurality of advertisement networks based, at least in part, on the application identifier;
select a network identifier of one of the subset of the plurality of advertisement networks based, at least in part, on the plurality of traffic allocations;
send an advertisement information request to an advertisement network corresponding to the network identifier; and
receive advertisement information returned by the advertisement network responsive to the advertisement information request; and
send the advertisement information to the proxy SDK.

11. The proxy server of claim 10, wherein the processor is further configured to:
generate a random number in a preset numerical range; and
select the network identifier based, at least in part, on a correspondence between the random number and a numerical value of a portion of traffic allocated to the advertisement network corresponding to the network identifier.

12. The proxy server of claim 10, wherein the processor is further configured to:
receive traffic allocation adjustment information comprising an identifier of a to-be-adjusted application, an identifier of a to-be-adjusted advertisement network, and an adjusted traffic allocation proportion of the to-be-adjusted advertisement network; and
adjust a traffic allocation corresponding to the identifier of the to-be-adjusted advertisement network to the adjusted traffic allocation proportion.

13. The proxy server of claim 10, wherein the processor is further configured to:
receive a statistical information from the proxy SDK, wherein the statistical information comprises operation information of the application.

14. The proxy server of claim 12, wherein the processor is further configured to:
receive a statistical information from the proxy SDK, wherein the statistical information comprises operation information of the to-be-adjusted application.

15. The proxy server of claim 10, wherein the processor is further configured to:
receive an advertisement clicking request from the proxy SDK;
count a number of advertisement clicking requests within a preset time; and
calculate an advertisement fee based, at least in part, on the number of the advertisement clicking requests.

16. The proxy server of claim 12, wherein the processor is further configured to:
receive an advertisement clicking request from the proxy SDK;
count a number of advertisement clicking requests within a preset time; and
calculate an advertisement fee based, at least in part, on the number of the advertisement clicking requests.

17. The proxy server of claim 10, wherein the processor is further configured to:
- collect a number of advertisement requests received within a preset time; and
- calculate an advertisement fee based, at least in part, on the number of the advertisement requests.

18. A terminal, comprising:
- a memory; and
- a processor coupled to the memory, wherein the processor is configured to:
  - send initial traffic allocation information to a proxy server during initialization of the proxy server, wherein the initial traffic allocation information comprises an identifier of an application, an identifier of an advertisement network, and an initial traffic allocation proportion of the advertisement network; and
  - send traffic allocation adjustment information to the proxy server, wherein the traffic allocation adjustment information comprises the identifier of the application, the identifier of the advertisement network, and an adjusted traffic allocation proportion of the advertisement network.

19. The method of claim 1, wherein selecting the network identifier of one of the subset of the plurality of advertisement networks comprises:
- determining a grade associated with the application identifier; and
- selecting the network identifier further based upon the grade.

20. The method of claim 4, wherein the operation information comprises one or more of: entering a main interface, entering a certain sub-interface, sending information, operation or entering a game interface.

21. The method of claim 5, wherein the statistics comprise one or more of the number of times of accessing a certain interface, an average time on the certain interface, or an interface bounce rate.

\* \* \* \* \*